May 1, 1951 P. POIRETTE 2,550,936
INTERCHANGEABLE DIAL FOR EXPOSURE METERS
Filed Sept. 24, 1947 3 Sheets-Sheet 1

Patented May 1, 1951

2,550,936

UNITED STATES PATENT OFFICE 2,550,936

INTERCHANGEABLE DIAL FOR EXPOSURE METERS

Paul Poirette, Neuilly-sur-Seine, France

Application September 24, 1947, Serial No. 775,857
In France November 28, 1946

7 Claims. (Cl. 235—64.7)

The exposure meters provided with photocells as executed to this day provide the indication of the exposure required for impressing the light-sensitive emulsion in accordance with the intensity of light given out by a hand, with the opening of the diaphragm and with the degree of sensitivity of the emulsion.

This arrangement requires the incorporation to the exposure meters of a preferably circular slide rule element which often leads to errors and the intricate scale of which makes the reading inconvenient and tiring.

Moreover, the use of this element of a slide rule requires a displacement of the latter at each view taking, if the light does not retain exactly the same intensity from one view taking to the next.

The drawbacks referred to hereinabove are such that many persons give up using exposure meters and consider their use as too difficult or not convenient enough.

In the arrangement disclosed hereinabove according to my invention, one of the variables, i. e. sensitivity of the emulsion is taken as a parameter and a removable dial is used which differs from one emulsion to another.

The dial is adapted to be changed through the agency of a system of slideways, rollers, axes, bayonet joints or the like. It may also include pivotal or rotary means so as to change the operative sector of the dial.

Each dial carries an indication as to the sensitivity of the emulsion for which it has been designed; said sensitivity is expressed in Schneider, Din, H. & D. Weston or the like degrees. Obviously if an emulsion involving a new scale of sensitivity were introduced in the art, the dials could be calibrated according to this scale. The exposure meter according to the invention may be used without any change of structure except that a new dial gauged according to the data of sensitivity of a new emulsion is provided.

In accompanying drawings, I have illustrated by way of example an exposure meter and its parts according to various embodiments of my invention. In said drawings.

Figure 4:
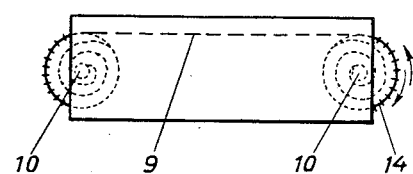
Figure 4A:
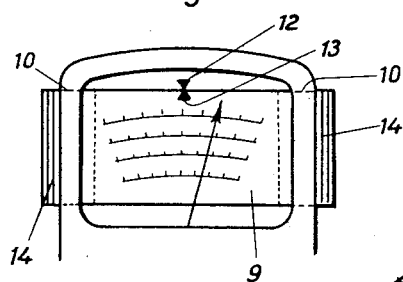
Figure 5:
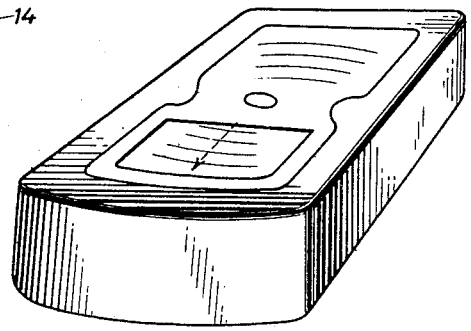
Figure 6:
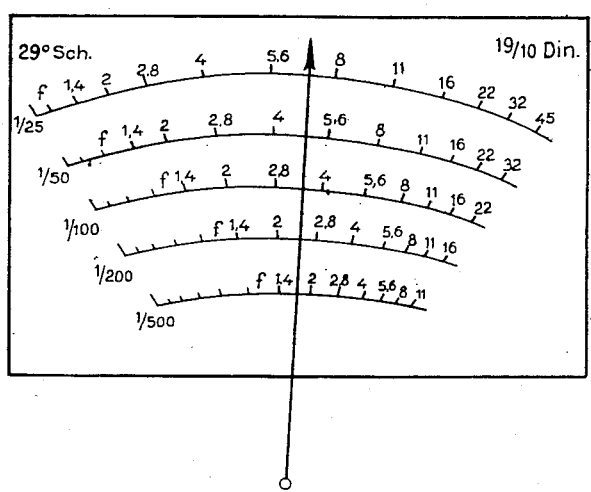

Fig. 4 is a cross-section of a system with a succession of dials carried by a strip adapted to be wound between two drums, Fig. 4a is a plan view of the same system, Fig. 5 is a perspective view of an exposure meter with a pivoting transparent dial, Fig. 6 illustrates an example of graduation of a dial giving out the values of diaphragm openings in accordance with different predetermined shutter-closing speeds.

Figure 7:
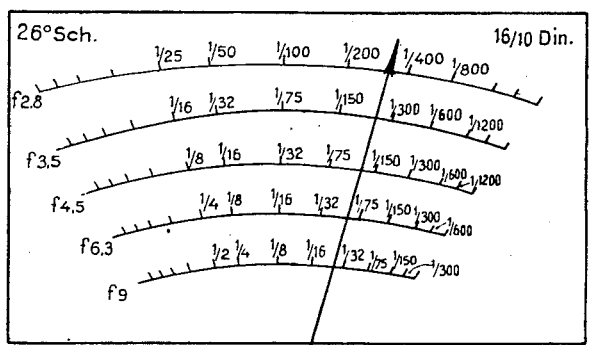

Fig. 7 is a modification of the preceding scale of which it forms the reverse, giving out the shutter-closing speeds as functions of various predetermined diaphragm openings.

Figure 8:
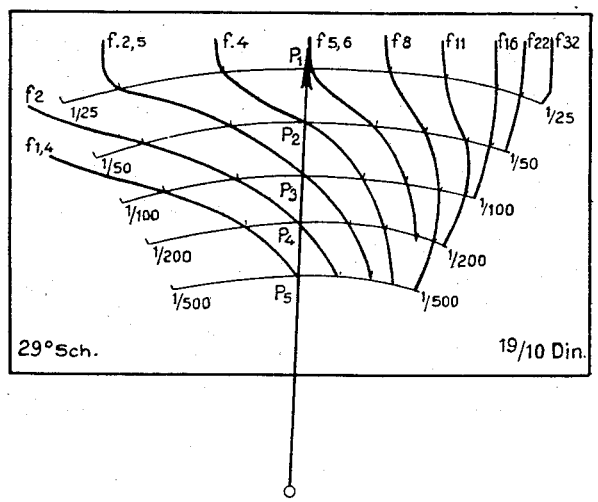

Fig. 8 is an example of a compound scale including a system of families of cooperating curves.

Figure 9:
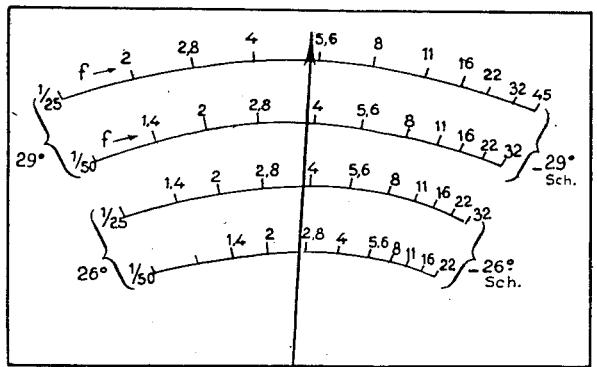

Fig. 9 illustrates a dial for a reduced number of shutter-closing speeds or diaphragms.

Figure 1:
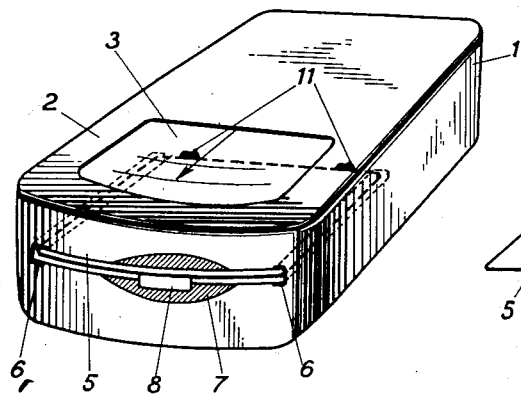
Fig. 1 is a perspective view of the meter according to my invention.

Returning to Fig. 1, it shows a casing 1 in the upper surface 2 of which is provided a gate 3 allowing inspection of the movements of the hand 4 in front of the dial 5 engaging slideways 6, that may be operated through an arrangement of notches 7 and that may be turned upside down through the agency of the projection 8.

The parameter chosen being the sensitivity of emulsion, the dial 5 carries the curves corresponding to the two remaining variables i. e. diaphragm openings and shutter-closing speeds and the movement of the hand over its graduations may give out the diaphragm for a predetermined shutter-closing speeds as shown in Fig. 6 or else the shutter closing speed for a predetermined diaphragm as in the case of Fig. 7.

Figure 2:
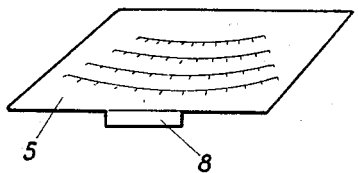
Fig. 2 is a view of a reversible dial.
Figure 3:
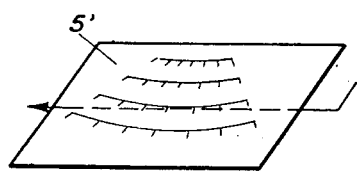
Fig. 3 is a view of a modification of said dial.

The removable dials or the dial-bearing strips 9 carried by rollers or drums 10 (Figs. 2, 3 and 4) may be printed to either side so as to reduce the number of dials or the length of strip required, or to obtain for a given emulsion a large number of graduated lines with an extension of the range of shutter-closing dials or of diaphragms. The use of such arrangements is of particular interest in the case of snapshots.

An intermediary solution may be used which consists in making use of this system for snapshots and retaining the prior system including a slide rule for time exposure, the scale being then less loaded and consequently more easily read.

Experience shows time-exposure is made use of much more rarely than snapshots. However, the present arrangement is applicable to both cases and may be made use of in lieu of the above disclosed solution by using to this purpose for instance one side of the dial for snapshots and the other side for time exposures.

In the execution of the system described, I may contemplate the use of a double hand or pointer, not illustrated, allowing the reading on two dials simultaneously for two different emulsions for instance or else on one dial for snapshots and on the other for time-exposure in the case of the use of a same emulsion in both cases.

As illustrated in Fig. 8, the dial may also be obtained through the impression of superposed systems of curves, one family of curves being used for finding the diaphragm and the other for the finding of the shutter-closing speed. The reading of the diaphragm opening and of the shutter-closing speed is provided by the curve intersecting point that is the nearest the hand of the meter.

There may be provided moreover for simplifying to a maximum the problem of the change of dials a system of interchangeable dials allowing a certain angle of shift to either side of the hand for taking into account emulsion sensitivities very near one another, so as to avoid a change of dial at every emulsion. This arrangement associated with a limited number of dials allows covering the whole range of emulsion sensitivities.

The different dials according to my invention may be located underneath the hand 4 of the meter or else over same according as to whether they are opaque or transparent. To each emulsion sensitivity corresponds a dial, which dial is gauged in accordance with the selected emulsion sensitivity.

Each dial may moreover, as shown in Fig. 9, be executed for one or more sensitivities by reducing the number of reading lines, that is by reducing to two for instance the number of shutter-closing speeds or of diaphragm openings to be considered, so that, as shown in Fig. 9 for instance, the same dial may include two curves for each of two sensitivities.

A system of stops 11 and of accurate sideways 6 ensures (Fig. 1) the proper positioning of the dial 5 in order to obtain the desired accuracy of reading.

In the system of dials wound over rollers illustrated in Figs. 4 and 4a, a stationary mark 12 is provided on the meter and a movable mark 13 on each dial 9 carried by the strip. Two marks 12 and 13 should register at each change of dials obtained for instance by means of knurled knobs 14 rigid with the drums or rollers, this registering of the marks ensuring accuracy in the location of the graduated scales.

In each arrangement, a catch system not illustrated may be provided for securing each dial in its position of use.

What I claim is:

1. In a photo-electric exposure meter having a movable hand in combination a box; an exchangeable dial member in said box cooperating with said movable hand carrying a set of curves drawn to represent the connection between diaphragm openings and shutter closing speeds for a given sensitivity of emulsion; and means in said box for holding said dial member in position in front of an opening in the wall of said box.

2. In a photo-electric exposure meter having a movable hand in combination a box; a set of exchangeable dial members each carrying a set of curves drawn to represent the connection between diaphragm openings and shutter closing speeds for a given sensitivity of emulsion; and means in said box for holding said dial members one at a time in position in front of an opening in the wall of said box cooperating with said movable hand.

3. In a photo-electric exposure meter having a movable hand in combination a box; an exchangeable dial member in said box including a plate carrying a set of curves drawn to represent the connection between diaphragm openings and shutter closing speeds for a given sensitivity of emulsion; and means including stops in said box for holding said dial member in position in front of an opening in the wall of said box cooperating with said movable hand.

4. In a photo-electric exposure meter having a movable hand in combination a box; an exchangeable dial member in said box including a plate carrying a set of curves drawn to represent the connection between diaphragm openings and shutter closing speeds for a given sensitivity of emulsion; and means including sideways and stops in said box for holding said dial member in position in front of an opening in the wall of said box cooperating with said movable hand.

5. In a photo-electric exposure meter having a movable hand in combination a box; an exchangeable dial member in said box including a plate carrying on both sides a set of curves drawn to represent the connection between diaphragm openings and shutter closing speeds for a given sensitivity of emulsion; and means including sideways and stops in said box for holding said dial member in position in front of an opening in the wall of said box cooperating with said movable hand.

6. A dial member for photo-electric exposure meters comprising a plate carrying a set of curves drawn to represent the connection between diaphragm openings and shutter closing speeds for a given sensitivity of emulsion.

7. A dial member for photo-electric exposure meters comprising a plate carrying a set of curves drawn to represent the connection between diaphragm openings and shutter closing speeds for a given sensitivity of emulsion, and a projection arranged in the middle of an edge of said plate at substantially right angles to said plate.

PAUL POIRETTE.

REFERENCES CITED

The following references are of record in the file of this patent:

UNITED STATES PATENTS

| Number | Name | Date |
| --- | --- | --- |
| 992,925 | Thomas | May 23, 1911 |
| 1,498,938 | Tillotson | June 24, 1924 |
| 1,878,832 | Egger-Hansen | Sept. 20, 1932 |
| 2,203,209 | Weston | June 4, 1940 |
| 2,247,763 | Meyers | July 1, 1941 |
| 2,274,441 | Williams | Feb. 24, 1942 |
| 2,421,504 | Hickok | Feb. 1, 1946 |
| 2,483,945 | Stimson | Oct. 4, 1949 |

FOREIGN PATENTS

| Number | Country | Date |
| --- | --- | --- |
| 10,314 | Great Britain | 1890 |
| 430,073 | Great Britain | June 4, 1935 |
| 621,490 | Germany | Nov. 7, 1935 |
| 648,957 | Germany | Aug. 11, 1937 |
| 803,580 | France | Oct. 3, 1936 |